(12) United States Patent
Dry et al.

(10) Patent No.: US 9,610,872 B2
(45) Date of Patent: Apr. 4, 2017

(54) THIGH SUPPORT PROVIDING FULL HEIGHT AUXILIARY FIRMNESS FOR AN UNOCCUPIED AND UNFOLDED, FOLD FLAT, AIR SUSPENDED SEAT

(71) Applicant: FORD GLOBAL TECHNOLOGIES, LLC, Dearborn, MI (US)

(72) Inventors: Alan George Dry, Grosse Pointe Woods, MI (US); Joseph S. Talamonti, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/821,894

(22) Filed: Aug. 10, 2015

(65) Prior Publication Data

US 2017/0043689 A1    Feb. 16, 2017

(51) Int. Cl.
*B60N 2/62* (2006.01)
*B60N 2/44* (2006.01)
*B60N 2/20* (2006.01)

(52) U.S. Cl.
CPC ........... *B60N 2/4415* (2013.01); *B60N 2/206* (2013.01); *B60N 2/62* (2013.01)

(58) Field of Classification Search
CPC .......... B60N 2/62; B60N 2/64; B60N 2/4415; B60N 2/206
See application file for complete search history.

(56) References Cited

U.S. PATENT DOCUMENTS

| | | | | |
|---|---|---|---|---|
| 3,330,598 A | * | 7/1967 | Whiteside | A47C 4/54 297/284.3 |
| 4,615,563 A | * | 10/1986 | Kobayashi | A47C 7/022 297/284.11 |
| 4,629,248 A | | 12/1986 | Mawbey | |
| 4,796,955 A | * | 1/1989 | Williams | B60N 2/4415 297/284.2 |
| 4,865,388 A | * | 9/1989 | Nemoto | B60N 2/487 297/403 |
| 5,082,326 A | * | 1/1992 | Sekido | B60N 2/4415 297/284.6 |
| 8,231,174 B2 | | 7/2012 | Yamada et al. | |

(Continued)

FOREIGN PATENT DOCUMENTS

| | | | | |
|---|---|---|---|---|
| DE | 2636314 B1 | * | 9/1977 | A47C 7/425 |
| DE | 2636314 C2 | * | 5/1978 | A47C 7/425 |

(Continued)

*Primary Examiner* — Robert Canfield
(74) *Attorney, Agent, or Firm* — Vichit Chea; Price Heneveld LLP

(57) ABSTRACT

A vehicle seating assembly comprises a seat having a plurality of air chambers disposed between a seat support and an elastomeric foam layer. The air chambers further comprise a primary chamber in fluid communication with a main chamber, and a secondary chamber in fluid communication with a supplemental chamber, wherein air is displaced from the main chamber to the primary chamber and air is displaced from the secondary chamber to the supplemental chamber when the lower seat is in a loaded condition. Air is displaced from the primary chamber to the main chamber and air is displaced from the supplemental chamber to the secondary chamber when the lower seat is in an unloaded condition.

20 Claims, 6 Drawing Sheets

(56) References Cited

U.S. PATENT DOCUMENTS

| | | | | |
|---|---|---|---|---|
| 9,321,373 | B2* | 4/2016 | Sakata et al. | B60N 2/0284 |
| 2008/0277985 | A1* | 11/2008 | Petzel | A47C 7/467 |
| | | | | 297/284.6 |
| 2009/0302652 | A1 | 12/2009 | Yamada et al. | |
| 2012/0007407 | A1 | 1/2012 | Komamura et al. | |
| 2014/0167465 | A1* | 6/2014 | Sakata et al. | B60N 2/0284 |
| | | | | 297/284.11 |
| 2016/0229316 | A1* | 8/2016 | Tamura et al. | B60N 2/4415 |
| 2016/0236597 | A1* | 8/2016 | Dry | B60N 2/525 |

FOREIGN PATENT DOCUMENTS

| | | | | |
|---|---|---|---|---|
| DE | 4013679 | A1 * | 11/1990 | B60N 2/4415 |
| DE | 10 2006 037 521 | A1 * | 5/2007 | B60N 2/162 |
| GB | 2232078 | B * | 6/1993 | B60N 2/162 |

\* cited by examiner

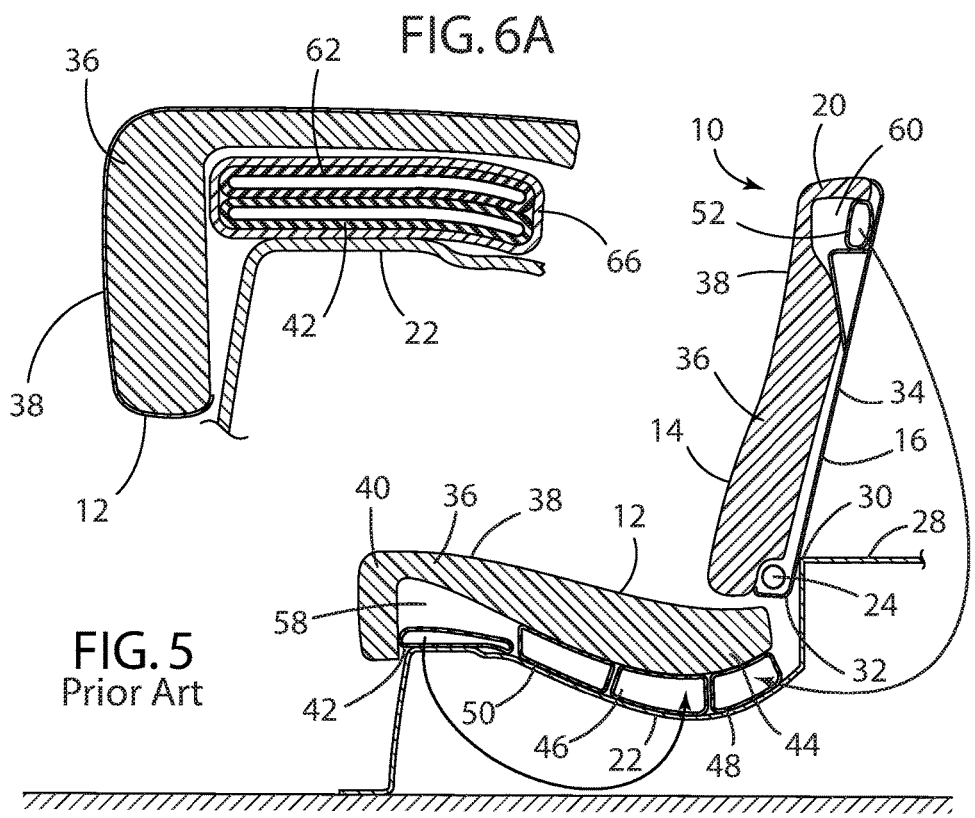
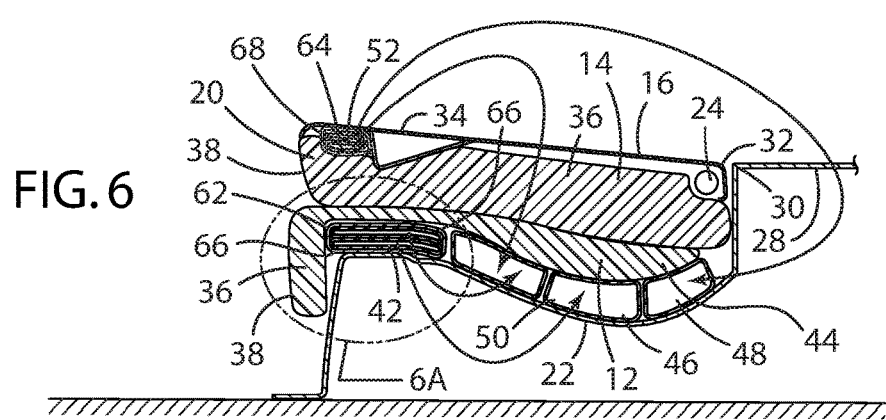

THIGH SUPPORT PROVIDING FULL HEIGHT AUXILIARY FIRMNESS FOR AN UNOCCUPIED AND UNFOLDED, FOLD FLAT, AIR SUSPENDED SEAT

FIELD OF THE INVENTION

The present invention generally relates to a vehicle seating assembly for a vehicle, and more particularly to a vehicle seating assembly having a thigh support providing full height auxiliary firmness for an unoccupied and unfolded, fold flat, air suspended seat.

BACKGROUND OF THE INVENTION

Vehicle seating assemblies typically include a horizontal seating support and a generally upright seatback. Certain vehicle seating assemblies employ a fold flat, air suspended seat having a system of passive air chambers, some of which are fitted across the front of the seat to support the thigh of the occupant when the seat is occupied. The thigh support chambers self-evacuate into the seat chambers when the seat is not occupied. However, as the thigh support chambers self-evacuate, the front edge of the seat is left unsupported, resulting in a very different feel and appearance from that of a standard foam supported seat cushion. Hence, a vehicle seating assembly which overcomes these drawbacks would be advantageous.

SUMMARY OF THE INVENTION

One aspect of the present invention includes a vehicle seating assembly for a vehicle that overcomes this disadvantage with a subsystem of passive air chambers.

Another aspect of the present invention includes a vehicle seating assembly wherein the vehicle seating assembly has a lower seat comprising a lower seat support structure, a first elastomeric foam layer and a plurality of lower air chambers disposed between the seat support frame and the elastomeric foam layer, the lower air chambers further comprising a self-evacuating primary thigh support chamber in closed fluid communication with a non-self-evacuating main lower seat chamber, and a non-self-evacuating secondary thigh support chamber in closed fluid communication with a supplemental lower support chamber. When the lower seat is in a loaded condition, air is displaced from the non-self-evacuating main lower seat chamber to the self-evacuating primary thigh support chamber and air is displaced from the non-self-evacuating secondary thigh support chamber to the supplemental lower support chamber. When the lower seat is returned to an unloaded condition, air is displaced from the self-evacuating primary thigh support chamber to the non-self-evacuating main lower seat chamber and air is displaced from the supplemental lower support chamber to the non-self-evacuating secondary thigh support chamber.

Yet another aspect of the present invention includes a vehicle seat comprising a primary chamber coupled with a support chamber and a secondary chamber coupled with a supplemental chamber, wherein air flows from the main chamber to the primary chamber and from the secondary chamber to the supplemental chamber when the seat is loaded, and air flows from the primary chamber to the main chamber and from the supplemental chamber to the secondary chamber when the seat is unloaded.

Yet another aspect of the present invention includes a vehicle seating assembly having a lower seat and a seatback pivotably coupled with the lower seat, the seatback operable between an upright, deployed position and a folded, stowed position. The lower seat comprises a lower seat support structure, a first elastomeric foam layer and a plurality of lower air chambers disposed between the seat support frame and the elastomeric foam layer, the lower air chambers further comprising a self-evacuating primary thigh support chamber in closed fluid communication with a non-self-evacuating main lower seat chamber, and a non-self-evacuating secondary thigh support chamber in closed fluid communication with a supplemental lower support chamber, wherein when the seatback is in the upright, deployed position and the lower seat is in a loaded condition, air is displaced from the main lower seat chamber to the self-evacuating primary thigh support chamber and air is displaced from the non-self-evacuating secondary thigh support chamber to the supplemental lower support chamber, and wherein when the seatback is in the upright, deployed position and the lower seat is in an unloaded condition, air is displaced from the self-evacuating primary thigh support chamber to the main lower seat chamber and air is displaced from the supplemental lower support chamber to the non-self-evacuating secondary thigh support chamber.

The seatback comprises a seatback support structure, a first elastomeric foam layer and a plurality of seatback air chambers disposed between the seatback support frame and the elastomeric foam layer, the seatback air chambers further comprising a self-evacuating primary seatback support chamber in closed fluid communication with a non-self-evacuating main seatback chamber, and a non-self-evacuating secondary seatback support chamber in closed fluid communication with a supplemental seatback support chamber, wherein when the seatback is in the upright, deployed position and the seat is in a loaded condition, air is displaced from the main seatback support chamber to the self-evacuating primary seatback chamber and air is displaced from the non-self-evacuating secondary seatback support chamber to the supplemental seatback support chamber, and wherein when the seatback is in the upright, deployed position and the seat is in an unloaded condition, air is displaced from the self-evacuating primary seatback support chamber to the main seatback chamber and air is displaced from the supplemental seatback support chamber to the non-self-evacuating secondary seatback support chamber.

A further aspect of the present disclosure is a vehicle seating assembly where the primary and secondary thigh support chambers are contained within a first non-elastic envelope having a first fixed volume and the primary and secondary seatback support chambers are contained within a second non-elastic envelope having a second fixed volume.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a side cross-sectional plan view of a prior vehicle seating assembly, where the seatback is in an upright, deployed position and the vehicle seating assembly is no longer occupied;

FIG. 6 is a side cross-sectional plan view of a vehicle seating assembly in accordance with the present disclosure, where the seatback is in a folded, stowed position;

FIG. 6A is an enlarged cross-sectional plan view of a portion of the vehicle seating assembly of FIG. 6 in accordance with the present disclosure;

DETAILED DESCRIPTION OF THE EMBODIMENTS

Figure 1:
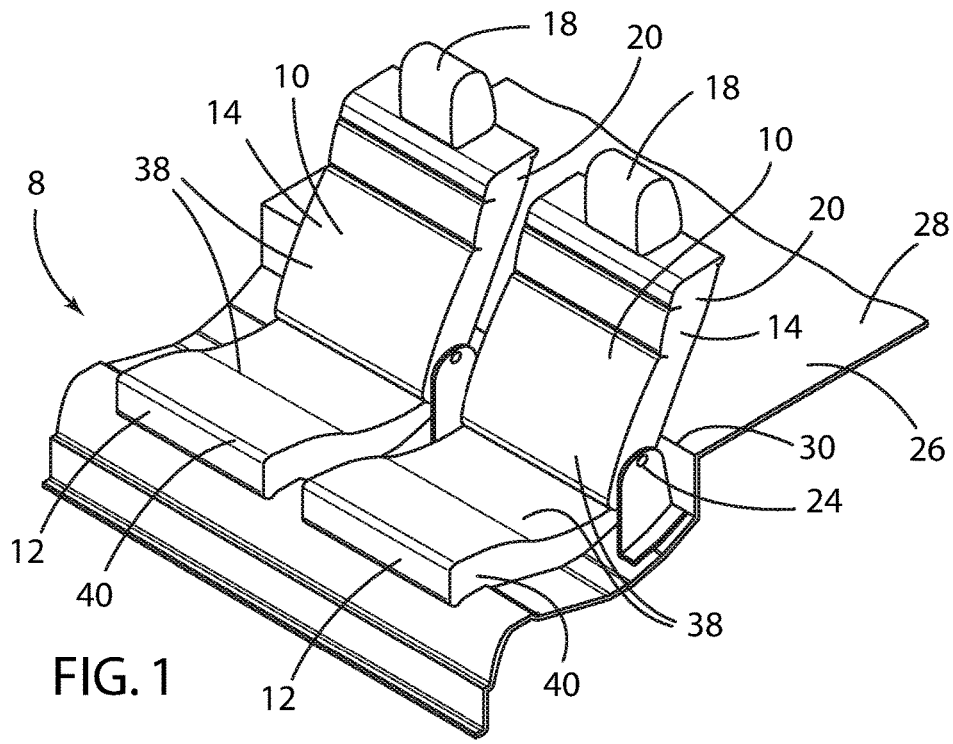
FIG. 1 is a side perspective view of a rear row of vehicle seating assemblies in accordance with the present disclosure in the upright, deployed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
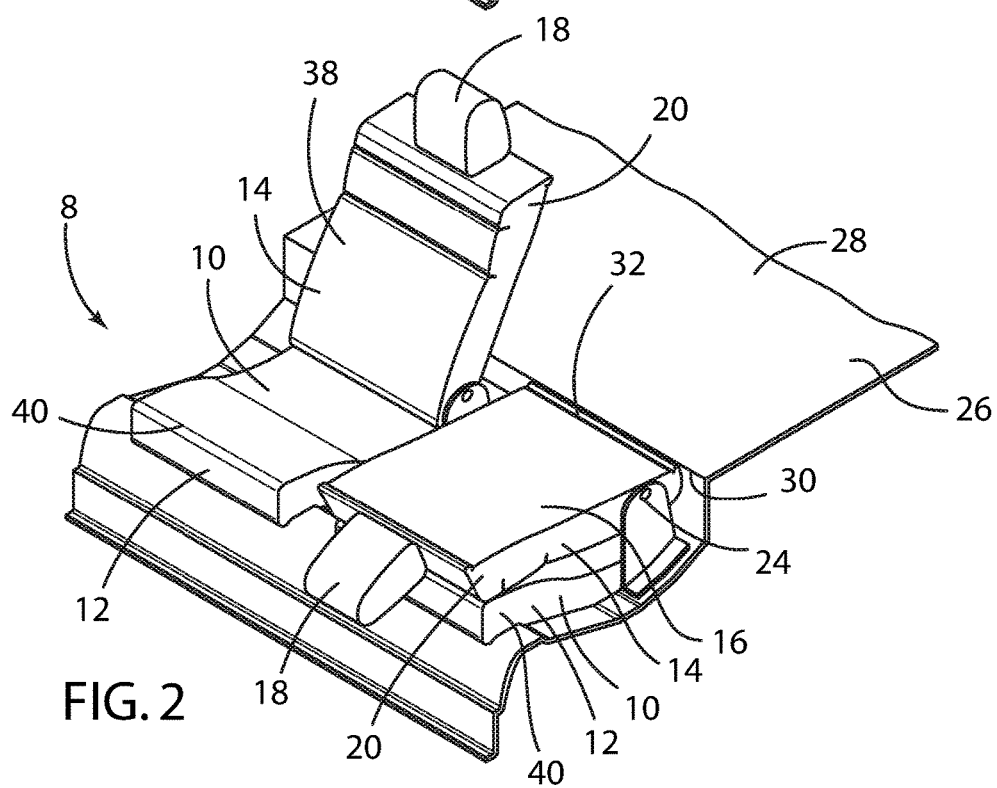
FIG. 2 is a side perspective view of a rear row of vehicle seating assemblies in accordance with the present disclosure, where one of the vehicle seating assemblies is in the upright, deployed position and another one of the vehicle seating assemblies is in the folded, stowed position.

Referring again to FIGS. 1 and 2, a vehicle seating assembly 10 is illustrated inside the vehicle cabin 8. The vehicle seating assembly 10 may be a seat for a driver, a seat for a passenger, a rear bucket seat, a rear row of seats, as shown, or any other vehicle seat. The vehicle seating assembly 10 includes a lower seat 12 and a seatback 14 pivotably attached to the lower seat 12 via pivot 24. The seatback 14 can move between an upright, deployed position, as shown in FIG. 1, and a folded, stowed position, as shown in FIG. 2. The seatback 14 of the vehicle seating assembly 10 includes a rear surface 16, which may be covered with a protective and/or decorative material. Carpeting is often and preferably employed. The vehicle seating assembly 10 may also include a head restraint 18 operably coupled to an upper portion 20 of the seatback 14 of the vehicle seating assembly 10. The vehicle seating assembly 10 also typically includes a vehicle seat frame 22, FIGS. 3-8, configured to provide structural support to the vehicle seating assembly 10. While the shown seat frame 22 is fixed, the vehicle seating assembly 10 may optionally be supported on rail assemblies, not shown, as is known in the art, to allow the vehicle seating assembly 10 to move fore and aft relative the longitudinal axis of the vehicle.

Figure 3:
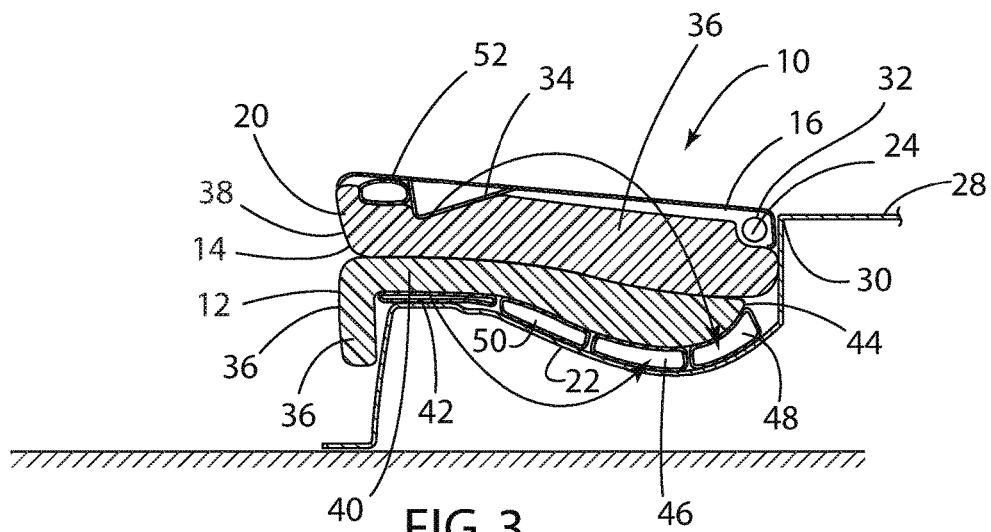
FIG. 3 is a side cross-sectional plan view of a prior vehicle seating assembly, where the seatback is in a folded, stowed position.

As shown in FIGS. 1 and 2, the vehicle seating assembly 10 is preferably placed just forward of a rear cargo receiving area 26, such as in a trunk of a sedan or the cargo compartment of hatchback, that forms a horizontal cargo surface 28. Such rear cargo receiving area 26 is likewise often covered with a protective and/or decorative material, such as carpeting. For ease in use and, in particular, in moving items that might be in the rear cargo receiving area 26 over the rear surface 16 of the seatback 14 when the seatback 14 is placed in the folded, stowed position, it is desirable that the rear surface 16 of the seatback 14 be as horizontal as possible, even with, and at the same height as the horizontal cargo surface 28 of the rear cargo receiving area 26. In particular, it is desirable that a leading edge 30 of the rear cargo receiving area 26 be proximate to and in substantially abutting relation with a trailing edge 32 of the rear surface 16 of the seatback 14 when the seatback 14 is placed in the folded, stowed position, e.g., as shown in FIG. 3. Further, when the carpeting or other covering on the seatback rear surface 16 is selected to match the carpeting or other covering over the horizontal cargo surface 28 of the rear cargo receiving area 26, a substantially continuous and attractive surface may be obtained.

Each of the lower seat 12 and the seatback 14 of the vehicle seating assembly 10 is provided with a rigid frame structure (vehicle seat frame 22 for the lower seat 12 and frame 34 for the seatback 14) and a foam layer 36 covered with a cover stock 38, such as leather, vinyl, or cloth. The frames 22, 34 can be made of a polymeric material, which is configured to support the weight of a passenger during vehicle occupancy. A more sturdy material, such as steel, may be used as desired by one of ordinary skill in the art to provide additional support. The foam layer 36 is adapted to support the cover stock 38 and the load of the occupant in the vehicle seating assembly 10 during vehicle occupancy.

It has been found desirable to provide an improved thigh support for the forward edge 40 of the lower seat 12. One technique for doing so involves the use of an inflatable air chamber disposed below the cover stock 38 and foam layer 36 beneath the occupant's thigh, the air chamber thereby urging the forward edge 40 upwardly relative to a rear edge 44 of the lower seat 12. However, when the seatback 14 is placed in the folded, stowed position, the rear surface 16 may be at a significant incline relative to the horizontal cargo surface 28 of the rear cargo receiving area 26.

In order to obtain a substantially horizontal rear surface 16 of the seatback 14 when it is placed in the folded, stowed position, it has been proposed to use alternatively inflatable and deflatable air chambers near the forward edge 40 of the lower seat 12 and the upper portion 20 of the seatback 14, e.g., as shown in FIG. 3. Therein, the lower seat 12 is provided with a self-evacuating primary thigh support chamber 42, a main lower seat chamber 46, and a main seatback chamber 48. The main lower seat chamber 46 and a main seatback chamber 48 are non-self-evacuating. The lower seat 12 also includes a supplemental lower support chamber 50. The seatback 14 is also provided with a self-evacuating primary seatback support chamber 52.

The self-evacuating primary thigh support chamber 42 and the self-evacuating primary seatback support chamber 52 are preferably constructed from a thin-walled resilient rubber-like material that has a minimal uninflated volume.

Thus, as the self-evacuating primary thigh support chamber 42 and the self-evacuating primary seatback support chamber 52 are inflated, there is a bias for the respective chamber to self-evacuate, as its walls are stressed by inflation. This bias can be controlled by selection of a resilient rubber-like material having a desired module of elasticity and the selection of the wall thickness of the chambers 42, 52. Preferably, neoprene is the selected material at a preferred wall thickness of 0.5 to 1.0 mm.

As shown in FIG. 3, the seatback 14 is in the flat folded, stowed position. As will be explained below, air from the self-evacuating primary thigh support chamber 42 has been transferred or exhausted to the main lower seat chamber 46 and air from the self-evacuating primary seatback support chamber 52 has exhausted to the main seatback chamber 48, enabling the rapid folding of the seatback 14 to the desired flat or near flat condition in the folded, stowed position.

Figure 9:
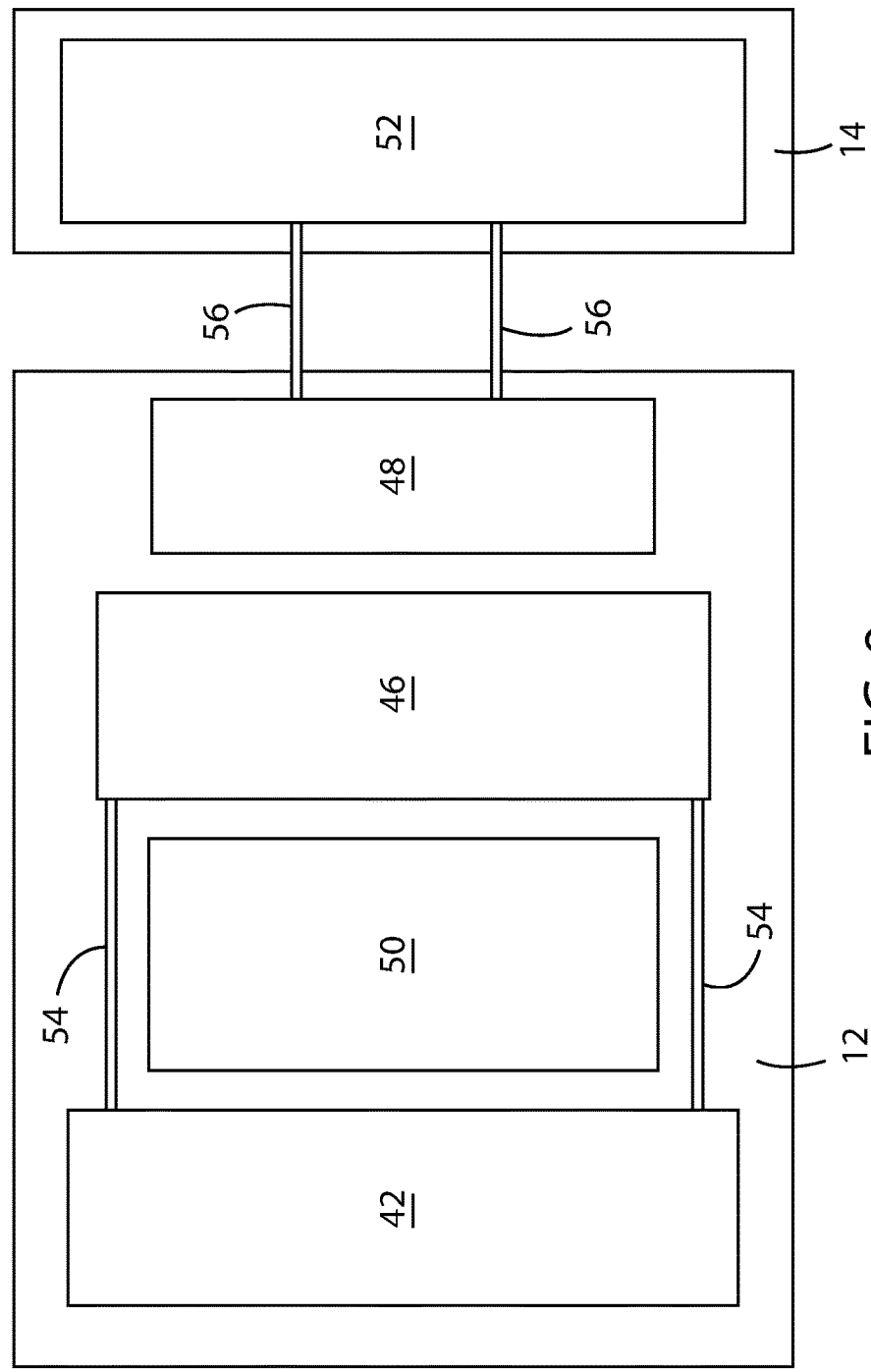
FIG. 9 is schematic representation of the interrelationship of the various chambers of a prior vehicle seating assembly.
Figure 10:
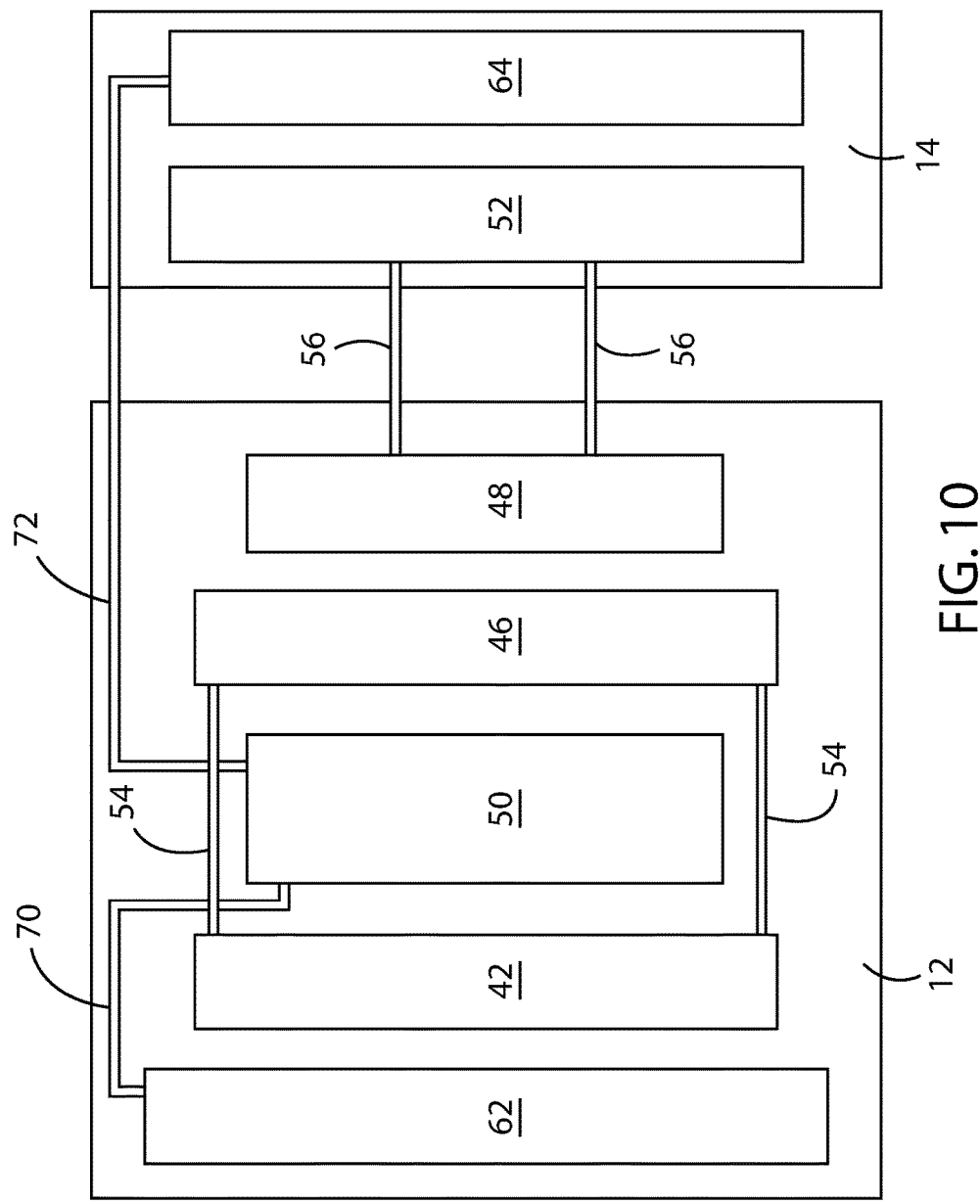
FIG. 10 is schematic representation of the interrelationship of the various chambers of a vehicle seating assembly in accordance with the present disclosure.

More particularly, the self-evacuating primary thigh support chamber 42 and the self-evacuating primary seatback support chamber 52, which would otherwise prevent the seatback 14 from folding flat when inflated, are in closed fluid communication with main lower seat chamber 46 and main seatback chamber 48, respectively, as shown in FIG. 9, and are completely collapsed by their own self-evacuating construction to achieve the minimum stack height and lowest angle for seatback 14 when the vehicle seating assembly 10 is unoccupied. That is, the self-evacuating primary thigh support chamber 42 has collapsed and the air contained therein passed to main lower seat chamber 46 via a thigh conduit 54, shown in FIG. 9. Similarly, the self-evacuating primary seatback support chamber 52, when the seatback 14 is in the folded, stowed position, is situated above and proximate to the self-evacuating primary thigh support chamber 42 and is also collapsed. Air contained therein has passed to main seatback chamber 48 via a seatback conduit 56, also shown in FIG. 9. The conduits 54, 56 can take many forms. Preferably, the conduits 54, 56 are formed by blow-molding or welding the conduits 54, 56 into the chambers 42, 46, 48, 50, and 52 and the foam layers 36 and inter-connecting the same with an elastomeric thin-walled tubing adequate to obtain the necessary mass flow of air to facilitate the present disclosure.

Figure 4:
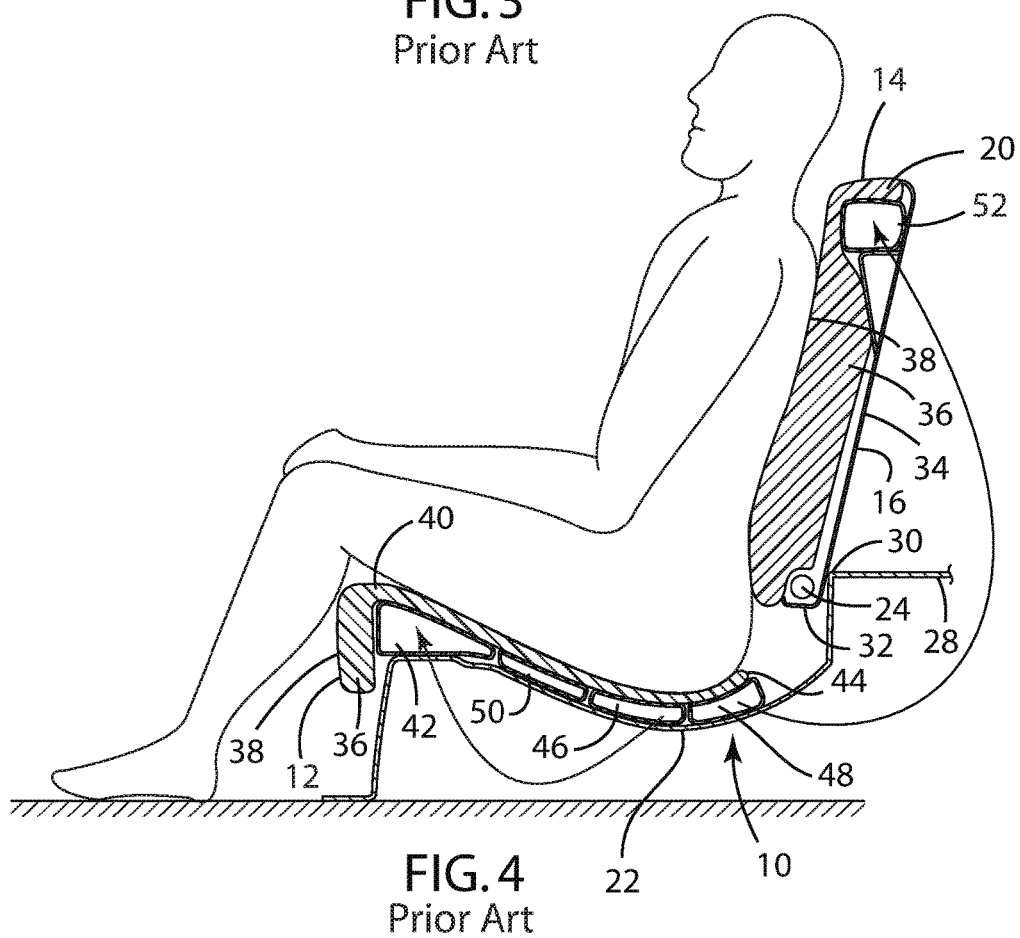
FIG. 4 is a side cross-sectional plan view of a prior vehicle seating assembly, where the seatback is in an upright, deployed position and the vehicle seating assembly is occupied.

As shown in FIGS. 3 and 4, main lower seat chamber 46 has both the largest volume when fully inflated and supports the majority of the occupant's torso mass. Main seatback chamber 48 is preferably slightly smaller than main lower seat chamber 46 due to the relatively smaller self-evacuating primary seatback support chamber 52, in comparison with self-evacuating primary thigh support chamber 42. Supplemental lower support chamber 50 has a relatively large volume, but being under the rear thigh actually carries little weight.

As noted above and as shown in FIG. 9, the self-evacuating primary thigh support chamber 42 is in fluid communication with main lower seat chamber 46 via thigh conduit 54. Thus, air can pass back and forth between the self-evacuating primary thigh support chamber 42 and the main lower seat chamber 46 when the seatback 14 is in the upright, deployed position.

As shown in FIG. 4, the seatback 14 is the upright, deployed position and an occupant is situated in the seat. As shown, the weight of the occupant on the main lower seat chamber 46 pressurizes the main lower seat chamber 46 and thus forces air from the main lower seat chamber 46 to the self-evacuating primary thigh support chamber 42 via thigh conduit 54. The effect is that the normally self-evacuating primary thigh support chamber 42 is re-pressurized to provide full thigh support to the occupant. Similarly, air has been forced by the weight of the occupant from the main seatback chamber 48 to the self-evacuating primary seatback support chamber 52 to provide full upper torso support via seatback conduit 56. As shown, supplemental lower support chamber 50 serves only to support the lower seat surface in cooperation with the foam layer 36.

FIG. 5 shows the vehicle seating assembly 10 with the seatback in the upright, deployed position and in the unoccupied condition. As shown, without the weight of the occupant on the main lower seat chamber 46 and main seatback chamber 48, the air in the elastomeric and self-evacuating primary thigh support chamber 42 and elastomeric and self-evacuating primary seatback support chamber 52 flows back into main lower seat chamber 46 and main seatback chamber 48, respectively, beneath the weight-bearing cushion. The weight-bearing area of the lower seat 12 above the main lower seat chamber 46 and main seatback chamber 48 is now fully inflated to meet a predetermined and desired seat surface profile. However, self-evacuating primary thigh support chamber 42 has now completely self-deflated back into the main lower seat chamber 46 and self-evacuating primary seatback support chamber 52 has now completely self-deflated back into main seatback chamber 48, such that the cover stock 38 and foam layer 36 above the self-evacuating primary thigh support chamber 42 and in front of the self-evacuating primary seatback support chamber 52 is completely and unacceptably supported, and voids 58, 60 are created therein, respectively. For example, placing a small, light item, such as book, at this time on the lower seat 12 above the void 58 would crush the cover stock 38 and foam layer 36 and deform the predetermined and desired surface profile.

To avoid the aforementioned problem of the voids 58, 60 forming above the self-evacuating primary thigh support chamber 42 and in front of the self-evacuating primary seatback support chamber 52, a separate air chamber subsystem is employed to provide secondary and supplemental support to the thigh support portion near the forward edge 40 of the lower seat 12 and the upper portion 20 of the seatback 14.

As shown in FIG. 6, an improved motor vehicle seat 10 is disclosed with the seatback 14 in the folded, stowed condition. Two additional air chambers, secondary thigh support chamber 62 and the secondary seatback support chamber 64, are disposed proximate the self-evacuating primary thigh support chamber 42 and the self-evacuating primary seatback support chamber 52, respectively. The secondary thigh support chamber 62 and the secondary seatback support chamber 64, however, are not self-deflating. Each is also disposed immediately beneath the vehicle seating assembly 10 cover stock 38 and foam layer 36 above the self-evacuating primary thigh support chamber 42 and in front of the self-evacuating primary seatback support chamber 52. Preferably, both the secondary thigh support chamber 62 and the secondary seatback support chamber 64 empty into a supplemental lower support chamber 50 to form a closed fluid subsystem via conduits 70, 72. The separate air chamber subsystem, however, operates at a much lower pressure than the self-evacuating primary thigh support chamber 42, the self-evacuating primary seatback support chamber 52, the main lower seat chamber 46, and the main seatback chamber 48.

Figure 7:
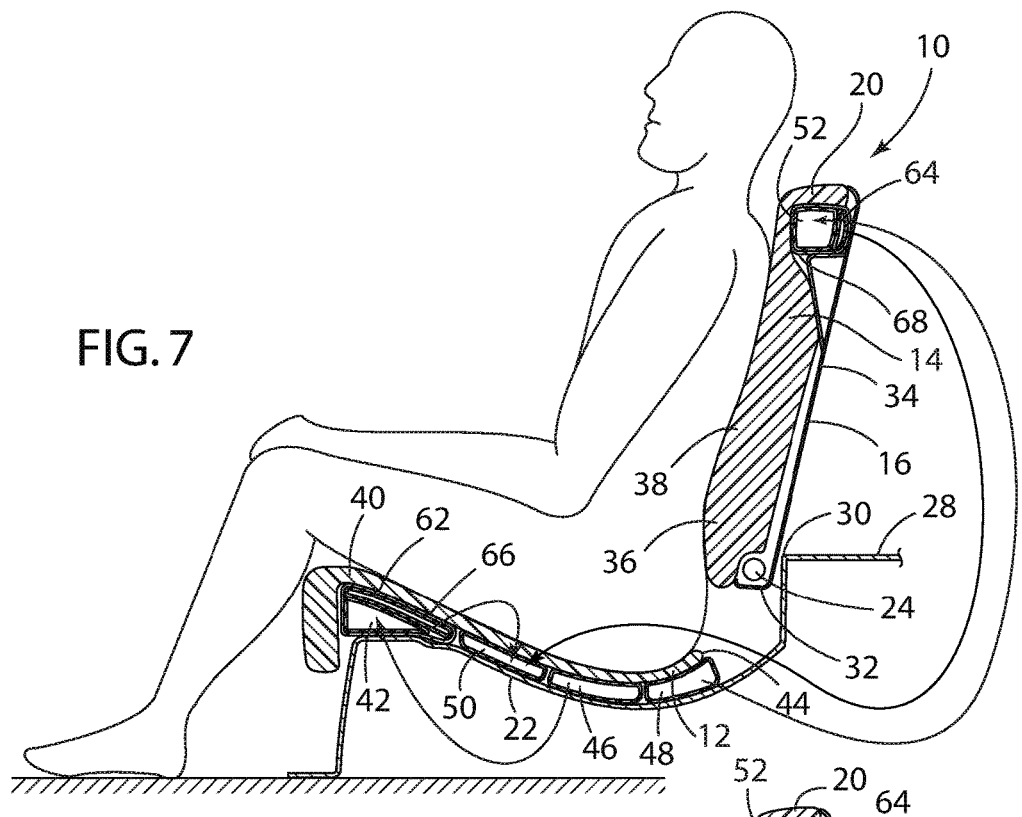
FIG. 7 is a side cross-sectional plan view of a vehicle seating assembly in accordance with the present disclosure, where the seatback is in an upright, deployed position and the vehicle seating assembly is occupied.
Figure 8:
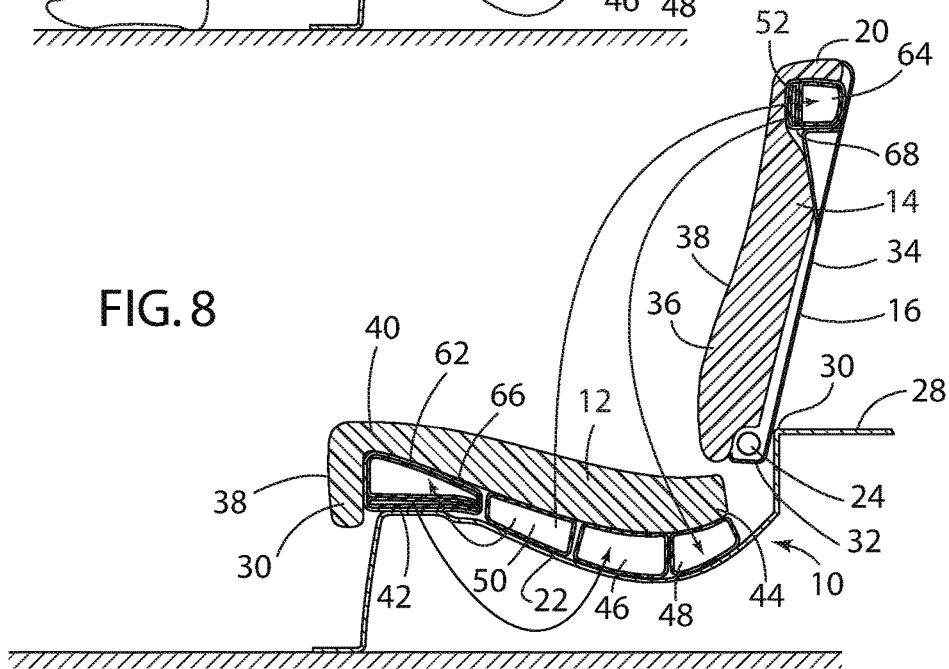
FIG. 8 is a side cross-sectional plan view of a vehicle seating assembly in accordance with the present disclosure, where the seatback is in an upright, deployed position and the vehicle seating assembly is no longer occupied.

Preferably, as shown in FIGS. 7 and 8, the total height of the combined stack of self-evacuating primary thigh support chamber 42 and secondary thigh support chamber 62 and total height of the combined stack self-evacuating primary seatback support chamber 52 and secondary seatback support chamber 64 is restricted, so that the outer surface of the cover stock 38 always meets the predetermined and desired surface profile. This may be obtained by limiting the total expansion of self-evacuating primary thigh support chamber 42 and secondary thigh support chamber 62 by enclosing the same in a first non-elastic envelope 66 of a first fixed volume that contains them both. Expansion of the self-evacuating primary thigh support chamber 42 at a high pressure will force the air in secondary thigh support chamber 62 into supplemental lower support chamber 50 at a low pressure, as self-evacuating primary thigh support chamber 42 occupies the fixed volume within the first non-elastic envelope 66. This ensures that the front thigh support portion is firmly supported and that the cover stock 38 and foam layer 36 is restrained to the required predetermined and desired surface profile. A similar second non-elastic envelope 68 of a second fixed volume (which may or may not be the same as the first fixed volume of the first non-elastic envelope 66) contains self-evacuating primary seatback support chamber 52 and secondary seatback support chamber 64.

The occupied seat is shown in FIG. 7. As shown, main lower seat chamber 46 is compressed by the weight of the occupant and, in turn, pressurizes the self-evacuating primary thigh support chamber 42, which expands within the first non-elastic envelope 66 to support the lower seat 12 beneath the occupant's thigh. At the same time, the air in secondary thigh support chamber 62 is forced back into the supplemental lower support chamber 50 and the secondary thigh support chamber 62 is collapsed. Similarly, the air in the secondary seatback support chamber 64 is forced back into the supplemental lower support chamber 50 within the second non-elastic envelope 68 and the secondary seatback support chamber 64 is collapsed.

As further shown in FIG. 8, when the seatback is in the upright, deployed position and is unoccupied, the self-evacuating primary thigh support chamber 42 and the self-evacuating primary seatback support chamber 52 become fully self-deflated. As a consequence, the main lower seat chamber 46 is pressurized and expands as well. The pressure in the supplemental lower support chamber 50, adjacent the main lower seat chamber 46, is likewise increased. The secondary thigh support chamber 62 and the secondary seatback support chamber 64 thus become inflated as their pressure equalizes with the supplemental lower support chamber 50 to effectively fill the voids 58, 60 and support the cover stock 38 and foam layer 36. As both the secondary thigh support chamber 62 and the secondary seatback support chamber 64 are not self-deflating, they both are urged to inflate when the seat is unoccupied, as shown in FIG. 8, to ensure a proper seat form, a basic level of support to the touch, and to obtain the predetermined and desired surface profile. Thus, when the seat is unoccupied, it always has its proper form and is never unsupported to the touch.

The pressure in the secondary thigh support chamber 62, the secondary seatback support chamber 64, and supplemental lower support chamber 50 is preferably so low that when the seatback 14 is placed in its folded, stowed position, the air in the secondary thigh support chamber 62 and the secondary seatback support chamber 64 is evacuated into supplemental lower support chamber 50 with a minimum of resistance to the folded, stowed seatback 14.

Thus, as shown in FIG. 8, the unoccupied seat cushion causes the self-evacuating primary thigh support chamber 42 and self-evacuating primary seatback support chamber 52 to vent into main lower seat chamber 46. The result is that secondary thigh support chamber 62 and secondary seatback support chamber 64 are expanded to support the cover stock 38 and foam layer 36 due to the equalization of pressure with supplemental lower support chamber 50. That is, when the lower seat 12 is unloaded, deflation of the self-evacuating primary thigh support chamber 42 displaces air to the main lower seat chamber 46, which further displaces air from the supplemental lower support chamber 50 to the non-self-evacuating secondary thigh support chamber 62 to inflate the non-self-evacuating secondary thigh support chamber 62, such that it substantially occupies the volume of the first non-elastic envelope 66. Deflation of the self-evacuating primary seatback support chamber 52 displaces air to the main seatback chamber 48, and air is further displaced from the supplemental lower support chamber 50 to the non-self-evacuating secondary seatback support chamber 64 to inflate the non-self-evacuating secondary seatback support chamber 64 at it substantially occupies the volume of the second non-elastic envelope 68.

Conversely, when the lower seat 12 is loaded, expansion of the self-evacuating primary thigh support chamber 42 from the air displaced from the main lower seat chamber 46 displaces air from the non-self-evacuating secondary thigh support chamber 62 to the supplemental lower support chamber 50, as the self-evacuating primary thigh support chamber 42 occupies the volume of the first non-elastic envelope 66. Expansion of the self-evacuating primary seatback support chamber 52 from the air displaced from the main seatback chamber 48 displaces air from the secondary seatback support chamber 64 to the supplemental seatback chamber 50 as the non-self-evacuating main seatback support chamber 48 occupies the volume of the second non-elastic envelope 68.

Moreover, it will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the terms "coupled" in all of its forms, couple, coupling, coupled, etc. and "connected" in all of its forms, connect, connecting, connected, etc. generally means the joining of two components electrical or mechanical directly or indirectly to one another. Such joining may be stationary in nature or movable in nature. Such joining may be achieved with the two components electrical or mechanical and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A vehicle seating assembly for a motor vehicle having a lower seat, wherein the lower seat comprises a lower seat support structure, a first elastomeric foam layer and a plurality of lower air chambers disposed between the lower seat support structure and the first elastomeric foam layer, the lower air chambers further comprising a self-evacuating primary thigh support chamber in closed fluid communication with a non-self-evacuating main lower seat chamber, and a non-self-evacuating secondary thigh support chamber in closed fluid communication with a supplemental lower support chamber, wherein when the lower seat is in a loaded condition, air is displaced from the non-self-evacuating main lower seat chamber to the self-evacuating primary thigh support chamber and air is displaced from the non-self-evacuating secondary thigh support chamber to the supplemental lower support chamber, and wherein when the lower seat is returned to an unloaded condition, air is displaced from the self-evacuating primary thigh support chamber to the non-self-evacuating main lower seat chamber and air is displaced from the supplemental lower support chamber to the non-self-evacuating secondary thigh support chamber.

2. The vehicle seating assembly of claim 1, further comprising a seatback pivotably coupled with the lower seat, the seatback operable between an upright, deployed position and a folded, stowed position, wherein the seatback comprises a seatback support structure, a second elastomeric foam layer and a plurality of seatback air chambers disposed between the seatback support structure and the second elastomeric foam layer, the seatback air chambers further comprising a self-evacuating primary seatback support chamber in closed fluid communication with a non-self-evacuating main seatback support chamber, and a non-self-evacuating secondary seatback support chamber in closed fluid communication with a supplemental seatback chamber, wherein when the seatback is in the upright, deployed position and the lower seat is in a loaded condition, air is displaced from the main seatback support chamber to the self-evacuating primary seatback support chamber and air is displaced from the non-self-evacuating secondary seatback support chamber to the supplemental seatback support chamber, and wherein when the seatback is in the upright, deployed position and the lower seat is returned to an unloaded condition, air is displaced from the self-evacuating primary seatback support chamber to the non-self-evacuating main seatback chamber and air is displaced from the supplemental seatback support chamber to the non-self-evacuating secondary seatback support chamber.

3. The vehicle seating assembly of claim 1, wherein the primary and secondary thigh support chambers are contained within a non-elastic envelope having a fixed volume.

4. The vehicle seating assembly of claim 3, wherein when the lower seat is loaded, expansion of the self-evacuating primary thigh support chamber from the air displaced from the non-self-evacuating main lower seat chamber displaces air from the non-self-evacuating secondary thigh support chamber to the supplemental lower support chamber as the self-evacuating primary thigh support chamber substantially occupies the volume of the non-elastic envelope.

5. The vehicle seating assembly of claim 3, wherein when the lower seat is unloaded, deflation of the self-evacuating primary thigh support chamber displaces air to the non-self-evacuating main lower seat chamber, and air from the supplemental lower support chamber is displaced to the non-self-evacuating secondary thigh support chamber to inflate the non-self-evacuating secondary thigh support chamber to substantially occupy the fixed volume of the non-elastic envelope.

6. The vehicle seating assembly of claim 2, wherein the self-evacuating primary thigh support chamber and the non-self-evacuating secondary thigh support chamber are contained within a first non-elastic envelope having a first fixed volume and the self-evacuating primary seatback support chamber and the non-self-evacuating secondary seatback support chamber are contained within a second non-elastic envelope having a second fixed volume.

7. The vehicle seating assembly of claim 6, wherein when the lower seat is loaded, expansion of the self-evacuating primary thigh support chamber from the air displaced from the main support chamber displaces air from the non-self-evacuating secondary thigh support chamber to the supplemental lower support chamber as the self-evacuating primary thigh support chamber occupies the first fixed volume of the first non-elastic envelope, and expansion of the self-evacuating primary seatback support chamber from the air displaced from the main seatback chamber displaces air from the secondary non-self-evacuating seatback support chamber to the supplemental seatback chamber as the second non-self-evacuating main seatback support chamber occupies the second fixed volume of the second non-elastic envelope.

8. The vehicle seating assembly of claim 7, wherein when the lower seat is unloaded, deflation of the primary self-evacuating thigh support chamber displaces air to the main lower seat chamber, which further displaces air from the supplemental lower support chamber to the non-self-evacuating secondary thigh support chamber to inflate the non-self-evacuating secondary thigh support chamber as it substantially occupies the first fixed volume of the first non-elastic envelope, and deflation of the self-evacuating primary seatback support chamber displaces air to the main seatback chamber, and air is further displaced from the supplemental seatback chamber to the non-self-evacuating secondary seatback support chamber to inflate the non-self-evacuating secondary seatback support chamber as it substantially occupies the second fixed volume of the second non-elastic envelope.

9. The vehicle seating assembly of claim 2, wherein the main lower seat chamber and the supplemental seatback chamber are disposed in the lower seat.

10. The vehicle seating assembly of claim 2, wherein the supplemental lower support chamber and the supplemental seatback chamber are the same.

11. The vehicle seat assembly of claim 1, further comprising a seatback pivotally coupled with the lower seat and operable between an upright, deployed position and a folded, stowed position, wherein the self-evacuating primary thigh support chamber and the non-self-evacuating secondary thigh support chamber are collapsed when the seatback is in the folded, stowed position.

12. The vehicle seat assembly of claim 2, wherein when the seatback is in the folded, stowed position, the self-evacuating primary thigh support chamber, the self-evacuating primary seatback support chamber, the non-self-evacuating secondary thigh support chamber, and the non-self-evacuating secondary seatback support chamber are collapsed.

13. A vehicle seat comprising a primary chamber coupled with a main chamber and a secondary chamber coupled with a supplemental chamber, wherein air flows from the main chamber to the primary chamber and from the secondary chamber to the supplemental chamber when the seat is loaded, and air flows from the primary chamber to the main chamber and from the supplemental chamber to the secondary chamber when the seat is unloaded.

14. The vehicle seat of claim 13, wherein the primary chamber is either a primary thigh support chamber or a primary seatback support chamber.

15. The vehicle seat of claim 13, wherein the vehicle seat has a lower seat and a seatback pivotally coupled with the lower seat, the seatback operable between an upright, deployed position and a folded, stowed position, wherein each of the lower seat and the seatback have a primary chamber coupled with a main chamber and a secondary chamber coupled with a supplemental chamber, wherein air flows from the main chamber to the primary chamber and from the secondary chamber to the supplemental chamber when the seat is loaded, and air flows from the primary chamber to the main chamber and from the supplemental chamber to the secondary chamber when the seat is unloaded.

16. The vehicle seat assembly of claim 15, wherein each of the primary chambers are self-evacuating, the support chambers are non-self-evacuating, the secondary chamber is non-self-evacuating, and the supplemental chamber is non-self-evacuating.

17. The vehicle seat assembly of claim 13, wherein a conduit provides fluid communication from the support chambers to the primary chambers and a conduit provides the fluid communication from each of the supplemental chambers to the main support chamber.

18. A vehicle seating assembly for a motor vehicle having a lower seat and a seatback pivotably coupled with the lower seat, the seatback operable between an upright, deployed position and a folded, stowed position, wherein;
the lower seat comprises a lower seat support structure, a first elastomeric foam layer and a plurality of lower air chambers disposed between the lower seat support structure and the first elastomeric foam layer, the lower air chambers further comprising a self-evacuating primary thigh support chamber in closed fluid communication with a non-self-evacuating main lower seat chamber, and a non-self-evacuating secondary thigh support chamber in closed fluid communication with a supplemental lower support chamber, wherein when the seatback is in the upright, deployed position and the lower seat is in a loaded condition, air is displaced from the main lower seat chamber to the self-evacuating primary thigh support chamber and air is displaced from the non-self-evacuating secondary thigh support chamber to the supplemental lower support chamber, and wherein when the seatback is in the upright, deployed position and the lower seat is in an unloaded condition, air is displaced from the self-evacuating primary thigh support chamber to the main lower seat chamber and air is displaced from the supplemental lower support chamber to the non-self-evacuating secondary thigh support chamber; and
the seatback comprises a seatback support structure, a second elastomeric foam layer and a plurality of seatback air chambers disposed between the seatback support structure and the second elastomeric foam layer, the seatback air chambers further comprising a self-evacuating primary seatback support chamber in closed fluid communication with a non-self-evacuating main seatback chamber, and a non-self-evacuating secondary seatback support chamber in closed fluid communication with a supplemental seatback support chamber, wherein when the seatback is in the upright position and the lower seat is in a loaded condition, air is displaced from the main seatback support chamber to the self-evacuating primary seatback chamber and air is displaced from the non-self-evacuating secondary seatback support chamber to the supplemental seatback support chamber, and wherein when the seatback is in the upright, deployed position and the lower seat is in an unloaded condition, air is displaced from the self-evacuating primary seatback support chamber to the main seatback chamber and air is displaced from the supplemental seatback support chamber to the non-self-evacuating secondary seatback support chamber.

19. The vehicle seat assembly of claim 18, wherein the secondary thigh support chamber, the secondary seatback chamber, the supplement lower support chamber, and the supplemental seatback chamber are in closed fluid communication with each other.

20. The vehicle seat assembly of claim 18, wherein the supplemental lower support chamber and the supplemental seatback chamber are the same chamber.

* * * * *